United States Patent [19]

Dahl et al.

[11] Patent Number: 4,808,693

[45] Date of Patent: Feb. 28, 1989

[54] ARYL ETHER KETONE COPOLYMERS

[75] Inventors: Klaus J. Dahl, Atherton; Viktors Jansons, Los Gatos; Stephen Moore, Redwood City, all of Calif.

[73] Assignee: Raychem Corporation, Menlo Park, Calif.

[21] Appl. No.: 875,122

[22] Filed: Jun. 17, 1986

Related U.S. Application Data

[63] Continuation-in-part of Ser. No. 775,888, Sep. 13, 1985, abandoned, which is a continuation-in-part of Ser. No. 692,606, Jan. 17, 1985, abandoned, which is a continuation of Ser. No. 643,222, Aug. 20, 1984, abandoned.

[51] Int. Cl.$^4$ .............................................. C08G 8/02
[52] U.S. Cl. ...................................... 528/125; 528/128; 528/174
[58] Field of Search ...................... 528/125, 128, 174

[56] References Cited

U.S. PATENT DOCUMENTS

| | | | |
|---|---|---|---|
| 3,065,205 | 11/1962 | Bonner | 528/125 |
| 3,516,966 | 6/1970 | Berr | 528/125 |
| 3,767,620 | 10/1973 | Angelo et al. | 525/419 |
| 3,956,240 | 5/1976 | Dahl | 528/125 |
| 4,186,262 | 1/1980 | Freeman et al. | 528/125 |

FOREIGN PATENT DOCUMENTS

| | | |
|---|---|---|
| 0124276 | 11/1984 | European Pat. Off. |
| 0135938 | 4/1985 | European Pat. Off. |
| 1086021 | 1/1968 | United Kingdom |

OTHER PUBLICATIONS

"Preparation of Aromatic Polymers", Ser. No. 922,837, filed Oct. 23, 1986.

*Primary Examiner*—John Kight
*Assistant Examiner*—Marvin L. Moore
*Attorney, Agent, or Firm*—Yuan Chao; Edith A. Rice; Herbert G. Burkard

[57] ABSTRACT

This invention relates to novel copolymers derived from diphenyl ether, terephthalic acid derivative and a third monomer of the formula

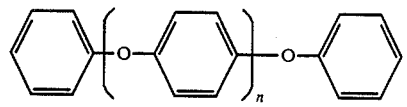

or

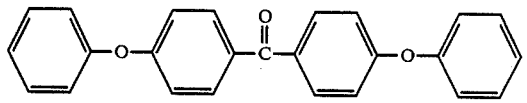

where n=1 or 2. The copolymers can be prepared by Friedel-Crafts polymerization. Preferred copolymers are derived from diphenyl ether, terephthaloyl chloride, and 1,4-diphenoxybenzene.

15 Claims, No Drawings

ARYL ETHER KETONE COPOLYMERS

REFERENCE TO RELATED APPLICATIONS

This application is a continuation-in-part of application Ser. No. 775,888, filed Sept. 13, 1985, now abandoned which is a continuation-in-part of application Ser. No. 692,606, filed Jan. 17, 1985 now abandoned which is a continuation of application Ser. No. 643,222, filed Aug. 20, 1984, now abandoned the disclosures of which are incorporated herein by reference.

BACKGROUND OF THE INVENTION

This invention relates to poly(aryl ether ketones) and in particular to copolymeric poly(aryl ether ketones).

Poly(arylene ketones), in particular, all para-linked poly(aryl ether ketones), possess many desirable properties, for example, high temperature stability, mechanical strength, and resistance towards common solvents. The preparation of poly(aryl ether ketones) by two different approaches has been described in the literature. The first approach is an electrophilic synthesis in which an aryl ketone linkage is formed. The second is a nucleophilic synthesis in which an aryl ether linkage is formed.

Efforts in recent years have been directed to the development of economical processes for commercial manufacture of these polymers. One factor considered in the economics is the cost of the monomer(s) used in preparing the polymer. One economically attractive polymer is described in U.S. Pat. No. 3,065,205 to Bonner and is produced from diphenyl ether and terephthaloyl chloride. The resulting polymer contains all para-linkages but is reported in U.S. Pat. No. 3,516,966 to Berr to be non-melt processable and subject to degradation under melt processing conditions. The problem is avoided by Berr by the use of a mixture of terephthaloyl and isophthaloyl chloride together with diphenyl ether.

It has been found that preparation of the all para-linked polymer derived from diphenyl ether and terephthaloyl chloride by the electrophilic process described by Bonner and Berr results in a polymer of relatively low molecular weight. A further disadvantage of the polymer is addressed in U.S. Pat. No. 3,767,620 to Angelo et al. Polymers prepared from diphenyl ether and terephthaloyl chloride or mixtures of tere- and isophthaloyl chlorides are reported to contain xanthydrol end groups which tend to make the polymer melt unstable. Angelo's solution to the problem is to react the polymer with a reducing agent. While such reduction may improve melt stability to a certain extent, the reduced end groups are likely to undergo air oxidation at elevated temperatures due to the presence of tertiary benzylic hydrogen atoms.

We have now discovered that high molecular weight, commercially viable, melt processable polymer can be prepared from diphenyl ether and terephthaloyl chloride by the addition of an appropriate comonomer. The resulting copolymer has higher molecular weight, lower xanthydrol end group content and improved melt stability over the polymer prepared from diphenyl ether and terephthaloyl chloride.

SUMMARY OF THE INVENTION

One aspect of this invention provides a poly(aryl ether ketone) having recurring units of the formula

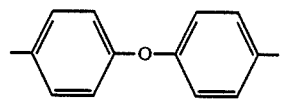
A

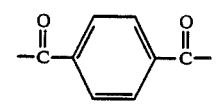
B and a third unit selected from the group consisting of

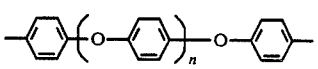
C and

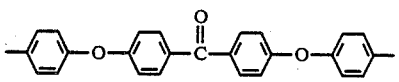
D where n is 1 or 2, the total number of A and C or D recurring units being substantially equal to the number of B recurring units.

Another aspect of this invention comprises a method of preparing a polymer which comprises reacting under Friedel-Crafts conditions in the presence of a Lewis acid, the following monomers:

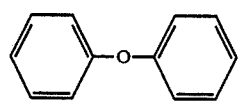
(a)

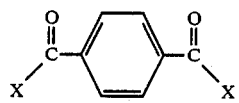
(b)

and a third monomer of the formula

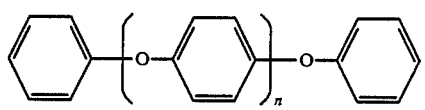
(c)

or

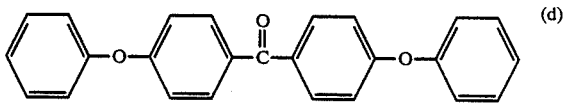
(d)

wherein X is a group displaceable under the Friedal-Crafts polymerization conditions, n is 1 or 2, and the number of moles of (a) plus (c) or (d) is substantially equal to the number of moles of (b).

Particularly preferred polymers are prepared from terephthaloyl chloride, diphenyl ether and 1,4-diphenoxy-benzene or 4,4'-diphenoxybenzophenone.

BRIEF DESCRIPTION OF THE DRAWINGS

FIG. 1 is a graph showing the reduction in xanthydrol end group formation with increasing amounts of 1,4-diphenoxybenzene in a copolymer of terephthaloyl chloride, diphenyl ether, and 1,4-diphenoxybenzene.

FIG. 2 is a graph showing that a copolymer of higher molecular weight, as measured by inherent viscosity, is obtained when the amount of diphenyl ether is decreased (and the amount of 1,4-diphenoxybenzene is correspondingly increased) in a copolymer of terephthaloyl chloride, diphenyl ether, and 1,4-diphenoxybenzene.

FIG. 3 is a graph showing the reduction in xanthydrol end grou formation with increasing amounts of 4,4'-diphenoxybenzophenone in a copolymer of terephthaloyl chloride, diphenyl ether, and 4,4'-diphenoxybenzophenone.

FIG. 4 is a graph showing that a copolymer of higher molecular weight, as measured by inherent viscosity, is obtained when the amount of diphenyl ether is decreased (and the amount of 4,4'-diphenoxybenzophenone is correspondingly increased) in a copolymer of terephthaloyl chloride, diphenyl ether, and 4,4'-diphenoxybenzophenone.

DETAILED DESCRIPTION OF THE INVENTION

Monomer (a) used in preparing the poly(aryl ether ketones) of this invention is diphenyl ether, i.e. the compound of the formula:

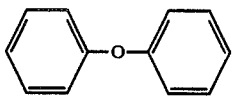
(a)

Monomer (b) is a diacid compound of the formula:

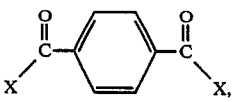
(b)

wherein X is a group displaceable under Friedel-Crafts polymerization conditions. X can be, for example, hydroxy, halo, e.g. chloro, fluoro or bromo, or alkoxy, e.g. methoxy, ethoxy, propoxy, isopropoxy, butoxy or the like. Preferably (b) is terephthaloyl chloride.

Monomer (c) is an aryl ether of the formula:

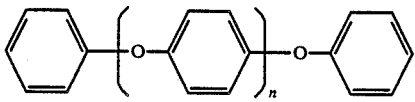
(c)

where n is 1 or 2, that is 1,4-diphenoxybenzene and 1-phenoxy-4-(p-phenoxyphenoxy)benzene.

Monomer (d) is 4,4'-diphenoxybenzophenone.

The molar amount of (a) plus (c) or (d) should be substantially equal to the molar amount of (b). As is well known in the art, an excess of electrophilic or nucleophilic reactant can be used to effect molecular weight control or capping. This is discussed in U.S. Pat. No. 4,247,682 to Dahl. The mole ratio of (a) to (c) or (d) can vary from 95:5 to 5:95, that is 95–5 moles diphenyl ether to 5–95 moles of 1,4-diphenoxybenzene, 1-phenoxy-4(p-phenoxyphenoxy)benzene, or 4,4'-diphenoxybenzophenone. Preferably the mole ratio of (a) to (c) or (d) is 80:20 to 20:80.

The polymers are prepared by Friedel-Crafts polymerization. In general the process comprises reacting the monomers together in the presence of a Lewis acid.

The term "Lewis acid" is used herein to refer to a substance which can accept an unshared electron pair from another molecule. Lewis acids which can be used in the practice of this invention include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride.

The polymerization may be carried out in the presence of a diluent. Preferred diluents include methylene chloride, carbon disulfide, o-dichlorobenzene, 1,2,4-trichlorobenzene, o-difluorobenzene, 1,2-dichloroethane, 1,1,2,2-tetrachloroethane and the like.

A preferred process for the preparation of the copolymers of this invention comprises using hydrogen fluoride and boron trifluoride as the reaction medium. This process is described in U.S. Pat. Nos. 3,953,400 and 4,247,682 to Dahl and U.S. Pat. No. 3,956,240 to Dahl and Jansons, the disclosures of which are incorporated herein by reference.

A second, and most preferred, method for preparing the copolymers of this invention is described in Jansons et al., U.S. Pat. No. 4,709,007 (1987), the disclosure of which is incorporated herein by reference. This application discloses a method of moderating or controlling Friedel-Crafts polymerization of this type. This can be accomplished by the addition of a Lewis base which acts as a controlling agent or by utilizing specified amounts of the Lewis acid. The term "Lewis base" is used to define any substance capable of donating an unshared electron pair to the Lewis acid.

Preferred Lewis bases for preparing the copolymers of this invention are N-methylformamide, N,N-dimethylformamide, N,N-dimethylacetamide, 1-methyl-2-pyrrolidone, tetramethylene sulfone (also known as sulfolane), n-butyronitrile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, sodium bromide, potassium chloride, potassium bromide and mixtures thereof.

The amount of Lewis base present should be from 0 to about 4 equivalents per equivalent of acid halide groups present in the monomer system. Amounts greater than 4 equivalents could be employed, if desired. However, no additional controlling effect is usually achieved by adding larger amounts. Thus, it is preferred to use no more than about 4 equivalents and generally no more than about 2 equivalents. When a Lewis base is added to control the reaction, at least about 0.01, preferably at least about 0.05 and most preferably at least about 0.5 equivalents of Lewis base per equivalent of acid halide groups present should be used.

The temperature at which the reaction is conducted is not critical and can be from about $-70°$ C. to about $+150°$ C., or even higher. It is preferred to start the reaction at lower temperatures, for example at about $-50°$ to about $-10°$ C. particularly if the monomer system contains highly reactive monomers. After polymerization has commenced, the temperature can be raised if desired, for example, to increase the rate of reaction. It is generally preferred to carry out the reaction at temperatures in the range of between about −30° C. and +25° C. (room temperature).

The reaction can also be moderated by use of appropriate excess of Lewis acid. In general, the amount of Lewis acid used in an amount of at least one equivalent per equivalent of carbonyl and other basic groups present in the reaction mixture plus an amount effective to act as a catalyst. In preparing the copolymers of this invention the catalytically effective amount should be between about 0.003 and about 0.5 equivalent per equivalent of acid halide groups.

The copolymers of this invention are high molecular weight polymers. By "high molecular weight" is meant polymer having an inherent viscosity greater than about 0.6. Preferably the polymer prepared by the process of this invention has an inherent viscosity in the range of about 0.6 to about 2.0. Polymers having an inherent viscosity below about 0.6 are generally not useful because they have poor mechanical properties, such as low tensile strength and elongation, while polymers having an inherent viscosity above about 2.0 are very difficult to melt process. Throughout this application, inherent viscosity refers to the mean inherent viscosity determined according to the method of Sorenson et al, "Preparative Methods of Polymer Chemistry" Interscience (1968), at page 44 [0.1 g polymer dissolved in 100 ml of concentrated sulfuric acid at 25° C.].

If desired, the molecular weight of the polymer, the degree of branching and amount of gelation can be controlled by the use of, for example, capping agents as described in U.S. Pat. No. 4,247,682 to Dahl, the disclosure of which is incorporated herein by reference. The molecular weight of the polymer can also be controlled by a polymerization reaction utilizing a two-monomer system as described above, by employing a slight excess of one of the monomers.

Capping agents, when employed, are added to the polymerization reaction medium to cap the polymer on at least one end of the polymer chain. This terminates continued growth of that chain and controls the resulting molecular weight of the polymer, as shown by the inherent viscosity of the polymer. Judicious use of the capping agents results in a polymer within a selected narrow molecular weight range, decreased gel formation during polymerization, and decreased branching of the polymer chains and increases melt stability. Both nucleophilic and electrophilic capping agents are used to cap the polymer at each end of the chain.

Preferred nucleophilic capping agents are 4-chlorobiphenyl, 4-phenoxybenzophenone, 4-(p-phenoxyphenoxy)benzophenone, biphenyl, 4-benzenesulfonylphenyl phenyl ether, and the like.

Typical electrophilic capping agents are compounds of the formula

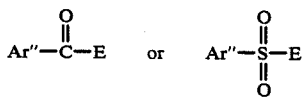

wherein Ar'' is phenyl, 3-chlorophenyl, 4-chlorophenyl, 4-cyanophenyl, 4-methylphenyl, phenoxyphenyl, naphthyl, biphenyl or an aromatic group substituted with an electron withdrawing substituent and E is halogen or other leaving group. Preferred electrophilic capping agents include benzoyl chloride, benzenesulfonyl chloride and the like.

In the preparation of the copolymers of this invention, a Lewis acid is employed. As a result, the polymer contains Lewis acid complexed to the carbonyl groups of the polymer. For many polymerizations, the Lewis acid is complexed to substantially all the carbonyl groups in the polymer. As is well known with polymers of this type, the catalyst residue must be removed, i.e. the Lewis acid must be decomplexed from the polymer and removed. A method for removing the catalyst residue is described in U.S. Pat. No. 4,237,884 to Dahl, the disclosure of which is incorporated herein by reference.

Decomplexation can be accomplished by treating the polymerization reaction mixture with a decomplexing base after completion of polymerization. The base can be added to the reaction medium or the reaction medium can be added to the base. The decomplexing base must be at least as basic towards the Lewis acid as the basic groups on the polymer chain. Such decomplexation should be effected before isolation of the polymer from the reaction mixture.

The amount of decomplexing base used should be in excess of the total amount of bound (complexed) and unbound Lewis acid present in the reaction mixture and is preferably twice the total amount of Lewis acid. Typical decomplexing bases which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulfide, tetramethylenesulfone, benzophenone, tetramethylammonium chloride, isopropanol and the like. The decomplexed polymer can then be recovered by conventional techniques such as separating the polymer by filtration; adding a nonsolvent for the polymer which is a solvent for or miscible with the Lewis acid/Lewis base complex and the Lewis acid; spraying the reaction medium into a non-solvent for the polymer; or evaporating the volatiles from the reaction medium and then washing with an appropriate solvent to remove any remaining base/catalyst complex and diluent from the polymer.

In recovery of the polymer from the reaction mixture, the reaction mixture can be liquefied, if desired by the method described in U.S. Pat. No. 4,665,151 (1987) of R. Reamey, the disclosure of which is incorporated herein by reference.

The following examples illustrate the preparation of typical copolymers of this invention.

EXAMPLE 1

The following standard procedure was used to prepare copolymers of terephthaloyl chloride, diphenyl ether and 1,4-diphenoxybenzene. The amounts of components used in each of 5 runs are given in Table I.

To a 100 ml resin kettle, add AlCl$_3$ (Witco #0099), LiCl (Alpha) and 25 ml dichloroethane to make a slurry. Cool to about −15° C. and stir with mechanical stirrer under N$_2$. Make a solution of monomers in 31 ml of dichloroethane. Add this solution dropwise to slurry over 15 minutes at −15° C. Place reaction in 0° C. bath and continue stirring for 24 hours.

Work-up - Take reaction mixture and place in blender containing approximately 400 ml of 10% aqueous HCl, blend for five minutes. Filter, wash with 1 liter H$_2$O. Blend for 5 minutes in 400 ml MeOH. Filter, wash with 500 ml of MeOH. Stir polymer in 400 ml of MeOH at approximately 50° C. overnight. Filter, wash with 1 liter of H₂O. Reflux in 500 ml of H₂O for 2 hours, filter (2X) and dry.

TABLE I

| Run | AlCl₃ | LiCl | DCE | TCL | DPE | DPB |
|---|---|---|---|---|---|---|
| A | 11.000 g | 1.060 g | 56 ml | 5.076 (25 mmol) | 6.558 g (25 mmol) | — |
| B | 22.000 g | 2.12 g | 56 ml | 10.1512 g (50 mmol) | 6.808 g (40 mmol) | 2.6235 g (10 mmol) |
| C | 22.000 g | 2.12 g | 56 ml | 10.151 g (50 mmol) | 4.255 g (25 mmol) | 6.558 g (25 mmol) |
| D | 22.000 g | 2.12 g | 56 ml | 10.151 g (50 mmol) | 1.704 g (10 mmol) | 10.492 g (40 mmol) |
| E | 22.000 g | 2.12 g | 56 ml | 10.151 g (50 mmol) | — | 13.115 g (50 mmol) |

DCE = dichloroethane
TCL = terephthaloyl chloride
DPE = diphenyl ether
DPB = 1,4-diphenoxybenzene The ultraviolet (UV) and visible spectra of each sample was analyzed and the normalized absorption at 452 nanometers (nm) was determined. Absorbance at this wavelength is due to the presence of xanthylium ion (due to the formation of xanthydrol end groups). The relative amount of xanthylium ion is shown in the graph of FIG. 1 versus the mole % of diphenoxybenzene. As can be seen, the amount of xanthylium ion in the polymer decreases as the proportion of diphenoxybenzene increases and thus the amount of diphenyl ether decreases.

The inherent viscosity (IV) of each polymer sample produced was determined according to the above-mentioned method of Sorenson et al, "Preparative Methods of Polymer Chemistry" Interscience (1968), at page 44 [0.1 g polymer dissolved in 100 ml of concentrated sulfuric acid at 25° C.]. The melting point of each sample was also determined. The results are shown in Table II.

TABLE II

| Run | DPE/DPB | IV | M.P (°C.) |
|---|---|---|---|
| A | 100/0 | 0.49 | 380 |
| B | 80/20 | 0.54 | 378 |
| C | 50/50 | 0.62 | 365 |
| D | 20/80 | 1.38 | 359 |
| E | 0/100 | 2.55 | 341 |

A graph showing the inherent viscosity versus the mole % of diphenyl ether used is shown in FIG. 2. As demonstrated by the graph the inherent viscosity obtained increases with a decreasing amount of diphenyl ether in the copolymer and a corresponding increase in the amount of diphenoxybenzene.

EXAMPLE 2

This example illustrates the preparation in HF/BF₃ of a copolymer of terephthaloyl chloride, diphenyl ether and 1,4-phenoxybenzene, with a diphenyl ether to diphenoxybenzene ratio of 20:80.

To a 120 ml Kel-F (polychlorotrifluoroethylene, Toko Kasei Co. Ltd., Osaka, Japan) reactor tube was added 0.3474 g (0.00204 mole) diphenyl ether, 2.1415 g (0.00816 mole) 1,4-diphenoxybenzene, and 2.0725 g (0.0102 mole) terephthaloyl chloride. The sealed reactor tube was cooled in a Dry Ice-acetone bath, followed by addition of 20 ml anhydrous HF (Matheson, 99.9%) and a magnetic stir bar. The reactor tube was then attached to a Kel-F manifold and 30 psi of BF₃ pressure was applied. The reactor tube being immersed in air at room temperature gradually warmed up, resulting in a clear solution. The system was degassed twice (slowly) to allow evolved HCl to escape, pressurized to 30 psi BF₃, and stirred for 16 hours at room temperature (24° C.). The resulting red viscous solution was cooled in an ice bath, slowly vented to ambient pressure, and diluted with 70 ml HF. The resulting low viscosity solution was slowly poured into ca. 750 ml. ice-water mixture which was rapidly agitated in a Waring blender. The resulting precipitated polymer suspension was allowed to stand for ca. 30 min, followed by filtration to collect the polymer, and washing with water on the filter. Re-blending of the pink filter cake in MeOH resulting in a nearly colorless fluffy product. This was soaked in water (ca. 30 min) and in methanol (ca. 30 min), followed by recovery and drying (2 hr. at 160° C.).

The resulting off-white copolymer (3.40 g) had an inherent viscosity of 2.83 (0.1 g/100 ml conc. H₂SO₄), and pressed (3 min/400° C.) to a tough flexible (both quenched and annealed) slab. DSC (from 100° to 400° C. at 20 degrees/min) of the quenched slab showed Tg at 165.5° C., crystallization exotherm at 196 degrees, and Tm endotherm maximum at 351 degrees (4.66 cal/g.).

EXAMPLE 3

This example illustrates the preparation in HF/BF₃ of a copolymer of terephthaloyl chloride, diphenyl ether and 1,4-diphenoxybenzene, with a diphenyl ether; diphenoxybenzene ratio of 50:50.

To a 60 ml Kel F reactor tube was added 0.4255 g (0.00250 mole) diphenyl ether, 0.6557 g (0.00250 mole) 1,4-diphenoxybenzene and 1.0151 g (0.00500 mole) terephthaloyl chloride. The sealed reactor tube was cooled in a Dry Ice-acetone bath, followed by addition of 10 ml anhydrous HF (Matheson, 99.9%) and a magnetic stir bar. The reactor tube was then attached to a Kel-F manifold and 30 psi of BF₃ pressure was applied. The reactor tube being immersed in air at room temperature gradually warmed up, resulting in a clear solution. The system was degassed twice (slowly) to allow evolved HCl to escape, pressurized to 30 psi BF₃, and stirred for 16 hours at room temperature (24° C.). The resulting red viscous solution was cooled in an ice bath, slowly vented to ambient pressure, and diluted with 40 ml HF. The resulting low viscosity solution was slowly poured into ca. 500 ml ice-water mixture which was rapidly agitated in a Waring blender. The resulting precipitated polymer suspension was allowed to stand for ca. 30 min, followed by filtration to collect the polymer, and washing with water on the filter. Re-blending of the pink filter cake in MeOH resulted in nearly colorless fluffy product. This was soaked in water (ca. 30 min) and in methanol (ca. 30 min), followed by recovery and drying (2 hr. at 160° C.).

The resulting off-white copolymer (1.14 g) had an inherent viscosity of 2.05 (0.1 g/100 ml conc. H₂SO₄), and pressed (3 min/400° C.) to a tough flexible (both quenched and annealed) slab. DSC (from 100° to 400° C. at 20 degrees/min.) of the quenched slab showed Tg at 166.8° C., crystallation exotherm at 203° C., and Tm endotherm maximum at 358° C.(4.1 cal/g).

EXAMPLE 4

This example illustrates the preparation in HF/BF₃ of a copolymer of terephthaloyl chloride, diphenyl ether and 1,4-diphenoxybenzene, with a diphenyl ether; diphenoxybenzene ratio of 80:20.

To a 120 ml Kel-F reactor tube was added 1.3695 g (0.00805 mole) diphenyl ether, 0.5278 g (0.00201 mole) 1,4-diphenoxybenzene and 2.0419 g (0.01006 mole) terephthaloyl chloride. The sealed reactor tube was cooled in a Dry Ice-acetone bath, followed by addition of 20 ml anhydrous HF (Matheson, 99.9%) and a magnetic stir bar. The reactor tube was then attached to a Kel-F manifold and 30 psi of BF₃ pressure was applied. The reactor tube being immersed in air at room temperature gradually warmed up, resulting in a clear solution. The system was degassed twice (slowly) to allow evolved HCl to escape, pressurized to 30 psi BF₃, and stirred for 16 hours at room temperature (24° C.). The resulting red viscous solution was cooled in an ice bath, slowly vented to ambient pressure, and diluted with 60 ml HF. The resulting low viscosity solution was slowly poured into ca. 700 ml ice-water mixture which was rapidly agitated in a Waring blender. The resulting precipitated polymer suspension was allowed to stand for ca. 30 min, followed by filtration to collect the polymer, and washing with water on the filter. Re-blending of the pink filter cake in MeOH resulted in nearly colorless fluffy product. This was soaked in water (ca. 30 min) and in methanol (ca. 30 min), followed by recovery and drying (2 hr. at 160° C.).

The resulting off-white copolymer (2.50 g) had an inherent viscosity of 1.75 (0.1 g/100 ml conc. H₂SO₄), and pressed (3 min/400 degrees) to a tough flexible (both quenched and annealed) slab. DSC (from 100° to 400° C. at 20 degrees/min) of the quenched slab showed Tg at 171.5° C., crystallization exotherm at 204° C., and Tm endotherm maximum at 361° C. (3.62 cal/g). The solution (with and without dilution) was coated on the inside walls of a large vial, followed by drying/24 degrees in a nitrogen stream, washing with excess methanol and water, and drying at 120° C./vacuum to give colorless, transparent and flexible films.

EXAMPLE 5

A resin kettle (100 mL), fitted with a mechanical stirrer and nitrogen inlet, ws charged with anhydrous aluminum chloride (10,000 g, 135 mmol.) and methylene chloride (20 mL). The resulting suspension was cooled to −30° C., whereupon dimetnylsulfone (3.529 g, 37.5 mmol.) was added. When the exothermic reaction had subsided, terephthaloyl chloride (TCl, 5.076 g, 25.0 mmol) and a mixture of diphenyl ether (DPE) and 4,4"-diphenoxybenzophenone (DPBP) (25.0 mmol combined, but ratio varying with each run) were added. The container for the monomers was rinsed with methylene chloride (10 mL), to ensure complete transfer. Once addition of the monomers was complete, the external cooling bath was removed and the reaction mixture was allowed to warm to ambient temperature.

After 2.5 hr, the reaction mixture was transferred to a 1 quart Waring blender containing 0.15% aqueous hydrochloride acid (300 mL). After blending, the polymer was isolated by filtration and washed with water. The polymer was digested in 0.15% aqueous hydrochloric acid (400 mL, 16 hr, ca. 80° C.) and isolated and washed as before. The polymer was next digested in 0.15% aqueous ammonium hydroxide (400 mL, 1 hour, reflux) and isolated and washed as before. The polymer was then dried in vacuo (180° C., 0.2 torr, 16 hours).

Results are summarized in Table III.

TABLE III

| Run | Molar Ratio DPE/DPBP | Weight Ratio DPE/DPBP (g/g) | Normalized Abs. (452 nm) | Inherent Viscosity |
|-----|----------------------|------------------------------|--------------------------|--------------------|
| F | 0/100 | 0/9.160 | 0.058 | 2.08 |
| G | 40/60 | 1.70/5.50 | 0.178 | 0.95 |
| H | 60/40 | 2.55/3.66 | 0.315 | 0.53 |
| I | 100/0 | 4.25/0 | 1.000 | 0.37 |

FIG. 3 shows how the normalized absorbance, indicative of xanthylium ion content, decreases with increasing content of 4,4'-diphenoxybenzophenone. The solvent was 50/50 trifluroacetic acid/methylene chloride. Normalized absorbance is the absorbance of a sample relative to that of a sample having 100% diphenyl ether (i.e., sample I).

FIG. 4 shows how the inherent viscosity of the copolymer produced decreased with increasing diphenyl ether content. That is, the inherent viscosity increases with increasing 4,4'-diphenoxybenzophenone conent.

We claim:

1. A poly(aryl ether ketone) having recurring units of the formula

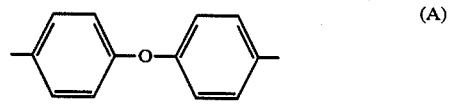

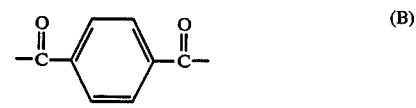

and a third unit selected from the group consisting of

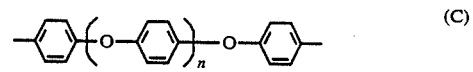

and

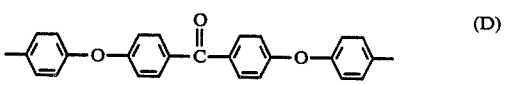

wherein n is 1 or 2, the total number of (A) and (C) or (D) recurring units being substantially equal to the number of B recurring units.

2. A copolymer in accordance with claim 1 having the recurring units (A), (B) and (C).

3. A copolymer in accordance with claim 2 wherein the ratio of recurring units of the formula (A) to recurring units of the formula (C) is 80:20.

4. A copolymer in accordance with claim 2 wherein the ratio of recurring units of the formula (A) to recurring units of the formula (C) is 50:50.

5. A copolymer in accordance with claim 2 wherein the ratio of recurring units of the formula (A) to recurring units of the formula (C) is 20:80.

6. A copolymer in accordance with claim 1 having the recurring units (A), (B) and (D).

7. A copolymer in accordance with claim 6 wherein the ratio of recurring units of the formula (A) to recurring units of the formula (D) is 60:40.

8. A copolymer in accordance with claim 6 wherein the ratio of recurring units of the formula (A) to recurring untis of the formula (D) is 40:60.

9. A polymer in accordance with claim 2 or claim 6 having an inherent viscosity above about 0.6.

10. A polymer in accordance with claim 2 or claim 6 having an inherent viscosity greater than about 0.8.

11. A polymer in accordance with claim 2 or claim 6 having an inherent viscosity greater than about 1.0.

12. A copolymer in accordance with claim 2 wherein the ratio of recurring units of the formula (A) to recurring units of the formula (C) is between 95:5 and 5:95.

13. A copolymer in accordance with claim 12 wherein the ratio of recurring units of the formula (A) to recurring units of the formula (C) is between 95:5 and 50:50.

14. A copolymer in accordance with claim 6 wherein the ratio of recurring units of the formula (A) to recurring units of the formula (D) is between 95:5 and 5:95.

15. A copolymer in accordance with claim 14 wherein the ratio of recurring units of the formula (A) to recurring units of the formula (D) is between 95:5 and 50:50.

* * * * *